UNITED STATES PATENT OFFICE.

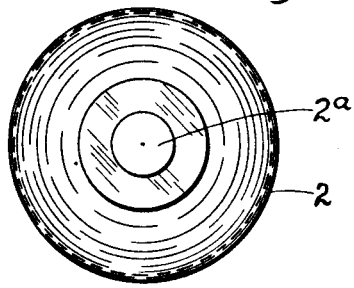
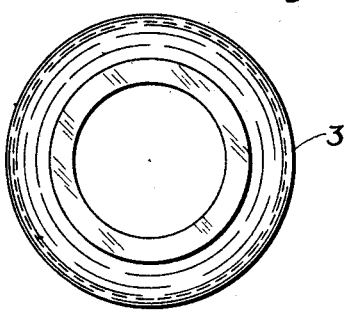
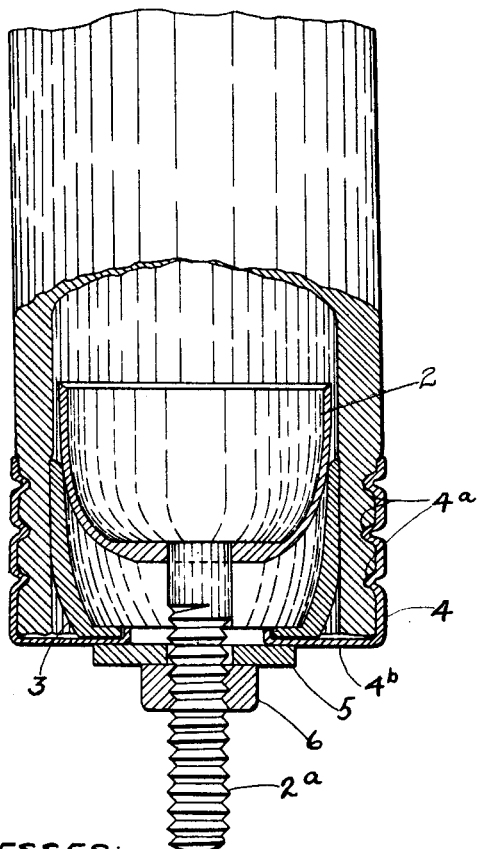
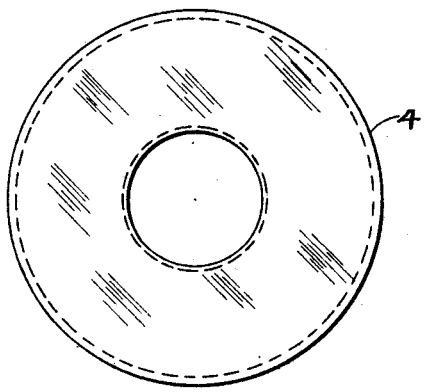

WUGBOLD HUISVELD AND CHRISTIAN HANSEN, OF SAN DIEGO, CALIFORNIA.

COMBINATION HOSE-PLUG.

1,089,057.     Specification of Letters Patent.     Patented Mar. 3, 1914.

Application filed April 4. 1913. Serial No. 758,758.

*To all whom it may concern:*

Be it known that we, WUGBOLD HUISVELD and CHRISTIAN HANSEN, citizens of the United States, residing at San Diego, in the county of San Diego and State of California, have invented certain new and useful Improvements in Combination Hose-Plugs, of which the following is a specification.

Our invention relates to improvements in plugs for hose or any other style of tubing of a soft and pliable material, and more particularly to be used for plugging the ends thereof, and the objects of our invention are, first, to provide a plug for hose or tubing of a soft and pliable material to close the ends thereof; second, to provide a plug that will clamp onto the hose and stand great pressure, and third, to provide such a plug that is simple of construction, durable, easily installed, easily removed and very efficient.

With these and other objects in view as will hereinafter appear, our invention consists of certain novel features of construction, combination and arrangement of parts as will be hereinafter described in detail and particularly set forth in the appended claims, reference being had to the accompanying drawings and to the characters of reference thereon, which form a part of this specification, in which:

Figure 1 is a sectional view of our combination hose plug complete shown mounted on the end of a hose, Fig. 2 is a detail view of the movable pressure part, Fig. 3 is a detail view of the expanding bushing and Fig. 4 is a detail view of the thimble.

Similar characters of reference refer to similar parts throughout the several views.

The combination plug consists of a movable pressure part 2, the expanding bushing 3, the thimble 4, the washer 5 and the nut 6. The thimble 4 is adapted to fit over the end of the hose and is provided with a plurality of inwardly extending ridges 4$^a$, as shown, preferably integral therewith, adapted to retain the hose or tube when the same is expanded within said thimble 4. It is provided with an inwardly extending flange 4$^b$ for retaining and supporting the expanding bushing 3. The expanding bushing 3 is shaped as shown best in Fig. 1 and is made of soft metal, preferably lead, and adapted to fit the inner surface of the hose. The movable pressure part 2 is tapered and shaped as shown best in Fig. 1 and is provided with a threaded spindle 2$^a$ adapted for the nut 6 which is screwed against a washer 5 which in turn has its bearing on sleeve flange 4$^b$. When the nut 6 is tightened against the washer 5 it draws the pressure plug 2 into the expanding bushing 3, which expands and presses the material of the hose or tube between the inwardly extending ridges 4$^a$ and against the inner surface of the thimble 4 forming a very tight connection.

Though we have shown and described a particular construction, combination and arrangement of parts, we do not wish to be limited to this particular construction, combination and arrangement of parts, but desire to include in the purview of our invention the construction, combination and arrangement substantially as set forth in the appended claims.

It will be readily seen that with the construction as shown there is provided a hose or tubing which provides a simple but effectual plug capable of withstanding great pressure, and that it is durable and easily placed on or removed from the hose.

Having thus described our invention, what we claim as new and desire to secure by Letters Patent, is:

1. In a combination hose plug, the combination of a thimble mounted over the end of a hose provided with a plurality of inwardly extending ridges, a tapered soft metallic bushing fitting the inner surface of said hose and a tapered pressure part adapted to be pressed into said bushing and spread the same, provided with a threaded spindle, and a nut and washer adapted to screw onto said spindle and against the end of said thimble, adapted to force said pressure part into said bushing.

2. In a combination hose plug, the combination with a hose, of a thimble mounted over the end of a hose provided with a plurality of inwardly extending ridges, a tapered soft metallic bushing fitting the inner surface of said hose, and a tapered pressure part adapted to be pressed into said bushing and spread the same, provided with a threaded spindle, and a nut and washer adapted to screw onto said spindle and against the end of said thimble, adapted to force said pressure part into said bushing, adapted to compress the end of the hose between said bushing and said thimble in accordance with the tension on said nut.

In testimony whereof, we have hereunto subscribed our names in the presence of two subscribing witnesses.

WUGBOLD HUISVELD.
CHRISTIAN HANSEN.

Witnesses:
ABRAM B. BOWMAN,
ELMER E. RODABAUGH.